(12) United States Patent
Lin et al.

(10) Patent No.: US 8,687,393 B2
(45) Date of Patent: Apr. 1, 2014

(54) POWER CONVERTER MODULE

(75) Inventors: Shu-Chia Lin, Taipei (TW); Wen-Yueh Hsieh, New Taipei (TW); Ching-Yuan Lin, Kaohsiung (TW)

(73) Assignee: Inno-Tech Co., Ltd., Taipei (TW)

( * ) Notice: Subject to any disclaimer, the term of this patent is extended or adjusted under 35 U.S.C. 154(b) by 251 days.

(21) Appl. No.: 13/421,851

(22) Filed: Mar. 15, 2012

(65) Prior Publication Data

US 2012/0287687 A1 Nov. 15, 2012

(30) Foreign Application Priority Data

May 13, 2011 (TW) .............................. 100116847 A

(51) Int. Cl.
*H02M 3/24* (2006.01)

(52) U.S. Cl.
USPC ..................... 363/95; 363/96; 363/97; 363/55

(58) Field of Classification Search
CPC ........................ H02M 3/33507; H02M 3/1588
USPC .................... 363/95, 87, 131–134, 91, 40–43; 307/66; 323/271–271, 205
See application file for complete search history.

(56) References Cited

U.S. PATENT DOCUMENTS

| 4,891,744 | A | * | 1/1990 | Yamamoto et al. | 363/89 |
| 5,532,918 | A | * | 7/1996 | Mayrand et al. | 363/89 |
| 8,213,195 | B2 | * | 7/2012 | Tsen et al. | 363/43 |
| 2002/0036911 | A1 | * | 3/2002 | Okui | 363/95 |
| 2008/0082277 | A1 | * | 4/2008 | Holmquist et al. | 702/64 |
| 2009/0161392 | A1 | * | 6/2009 | Zhang et al. | 363/40 |
| 2012/0181871 | A1 | * | 7/2012 | Johansen et al. | 307/66 |

* cited by examiner

*Primary Examiner* — Timothy J Dole
*Assistant Examiner* — Shahzeb K Ahmad

(57) ABSTRACT

A power converter module is disclosed, which is an all-digital module. The power converter module includes a reference voltage generation unit, a voltage loop control unit, a current loop control unit, an input voltage compensation unit, and a pulse width modulation generation unit, to transfer input power to stable output power for providing power to an external loading device through driving bridge switch unit with external driver. The voltage loop control unit and the current loop control unit contain a proportion-integral-differentiation controller for receiving signal related to voltage and current of loading device to form voltage control loop and current control loop. The pulse width modulation generation unit contains function of deciding necessary stop time to improve quality of output power and decrease the effect of input power and loading variation, and to provide stable sine-waveform output power to the external loading device.

11 Claims, 7 Drawing Sheets

POWER CONVERTER MODULE

BACKGROUND OF THE INVENTION

1. Field of the Invention

The present invention generally relates to a power converter module, especially utilizing a proportion-integral-differentiation controller to construct voltage loop control unit and current loop control unit for improving quality of output power and decreasing effect of input power and loading variation.

2. The Prior Arts

The inverter, also called the frequency converter, or the voltage converter, is an electrical device that transfers direct-current power to alternating-current power with characterization of changeable frequency, for providing power to device operated by alternating-current voltage, such as a power converter module of a solar battery cell, power converter modules of wind power generation, alternating-current motor power supplies, back light module of liquid crystal display, a charger, and an uninterruptible power supply (UPS) system.

In conventional design, an inverter uses a function of voltage or current loop control to obtain stable output power. However, the disadvantage of this design includes an output power easily affected by instant loading variation i.e., weak dynamic response, especially the weak compensation capability for non-linear effect, and leads to malfunctioning or damage of loading devices. As a result, a need exists for a power converter module having a two loop control utilizing voltage loop unit and current loop unit with proportion-integral-differentiation structure to solve the problems listed above.

SUMMARY OF THE INVENTION

A primary objective of the present invention is to provide a power converter module, which is an all-digital module and includes a reference voltage generation unit, a voltage loop control unit, a current loop control unit, and an input voltage compensation unit, and a pulse width modulation generation unit, to converter input power to stable output power for providing power to an external loading device with external pulse width modulation driver and a full or half bridge switch unit.

The reference voltage generation unit produces a reference voltage according to a direct-current input voltage, and the voltage loop control unit receives an external voltage and an external first current, and produces a reference current according to the reference voltage. The current loop control unit receives an external voltage and an external second current, and produces a first public voltage according to the reference current. The input voltage compensation unit receives the external direct-current voltage, and produces a second public voltage according to a first public voltage. The pulse width modulation generation unit receives the second public voltage to produce a pulse width modulation signal, the pulse width modulation signal of the pulse width modulation generation unit is provided to be received by an external driving device to control an external switch unit, and to provide stable sine-waveform power supply to an external loading connected to a switch unit.

Therefore the present invention of power converter module is digital operated with high operation stability and reliability, and may reduce external noise interference. The present invention simultaneously uses voltage control loop and current control loop formed by voltage loop control unit and current loop control unit, and the pulse width modulation generation unit contains function of deciding necessary stop time to improve quality of output power and decrease effect of input power and loading variation and to provide stable sine-waveform output power to external loading device, is suitable for power converter device, such as online uninterruptible power supply (Online UPS), solar power system, wind power generation system, and alternating-current motor power supply.

The foregoing and other features, aspects and advantages of the present invention will become better understood from a careful reading of a detailed description provided herein below with appropriate reference to the accompanying drawings.

BRIEF DESCRIPTION OF THE DRAWINGS

The accompanying drawings, which are incorporated in and constitute a part of this specification, illustrate exemplary embodiments consistent with the invention and, together with the description, serve to explain the principles of the invention.

DETAILED DESCRIPTION OF THE PREFERRED EMBODIMENTS

Reference will now be made in detail to the exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems consistent with aspects related to the invention as recited in the appended claims.

Figure 1:
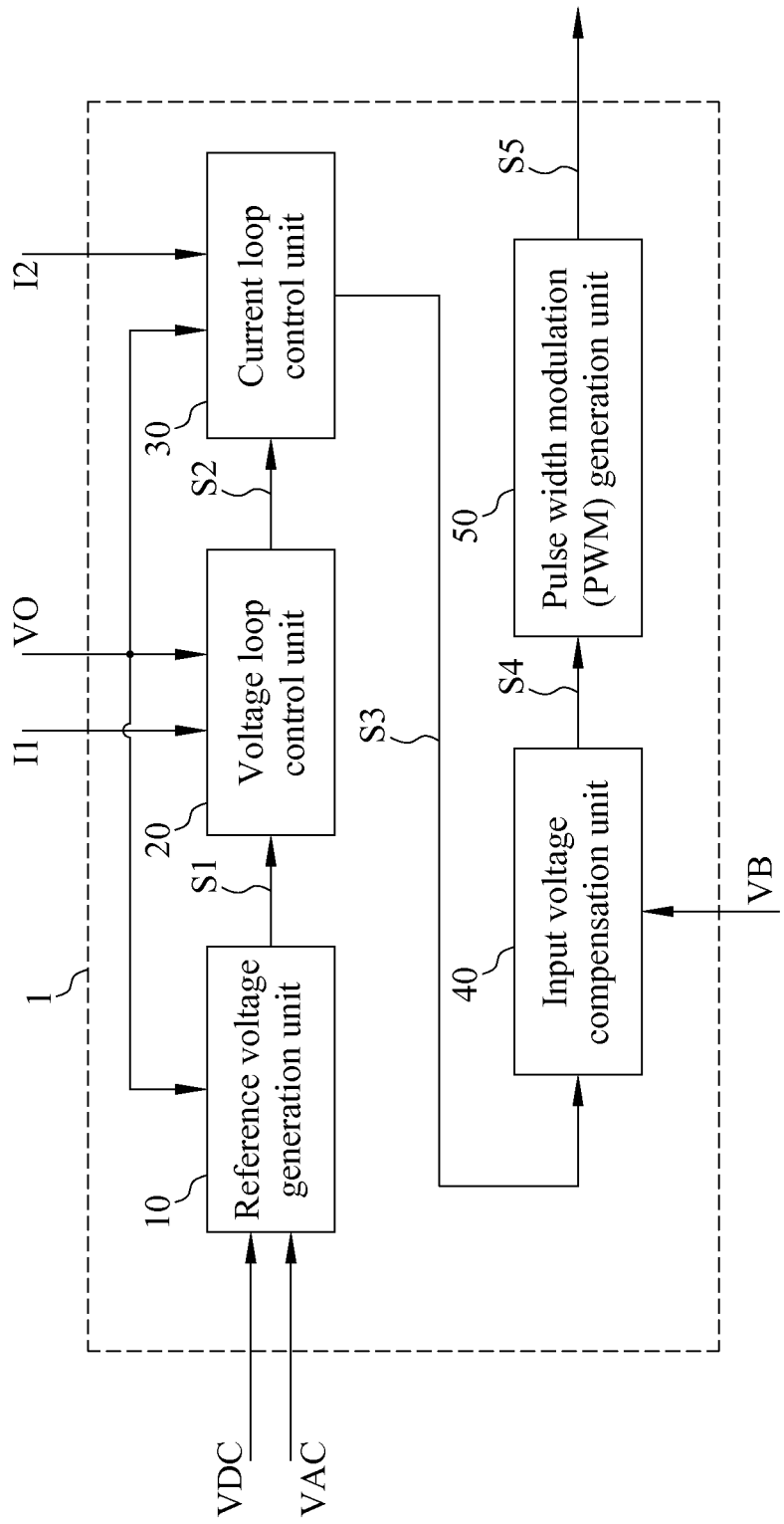
FIG. 1 illustrates a power converter module according to an exemplary embodiment of the present invention.

FIG. 1 illustrates a power converter module according to an exemplary embodiment of the present invention. Referring to FIG. 1, the power converter module 1 includes a reference voltage generation unit 10, a voltage loop control unit 20, a current loop control unit 30, a input voltage compensation unit 40, and a pulse width modulation (PWM) generation unit 50, wherein all units are implemented by digital design, i.e., there are no analog circuits in the power converter module 1 of the present invention.

In exemplary embodiment, the reference voltage generation unit 10 receives an external voltage VO, produces a reference voltage S1 according to a direct-current input voltage VDC with referring an alternating-current input voltage VAC. The voltage loop control unit 20 receives the external voltage VO and a first external current I1, and produces a reference current S2 according to the reference voltage S1. The current loop control unit receives the external voltage VO and a second external current I2, and produces a first public voltage S3 according to the reference current S2. The input voltage compensation unit 40 receives an external direct-current voltage VB, and produces a second public voltage S4 according to the first public voltage S3. The PWM generation unit 50 receives the second public voltage S4 to produce a pulse width modulation (PWM) signal S5.

Figure 2:
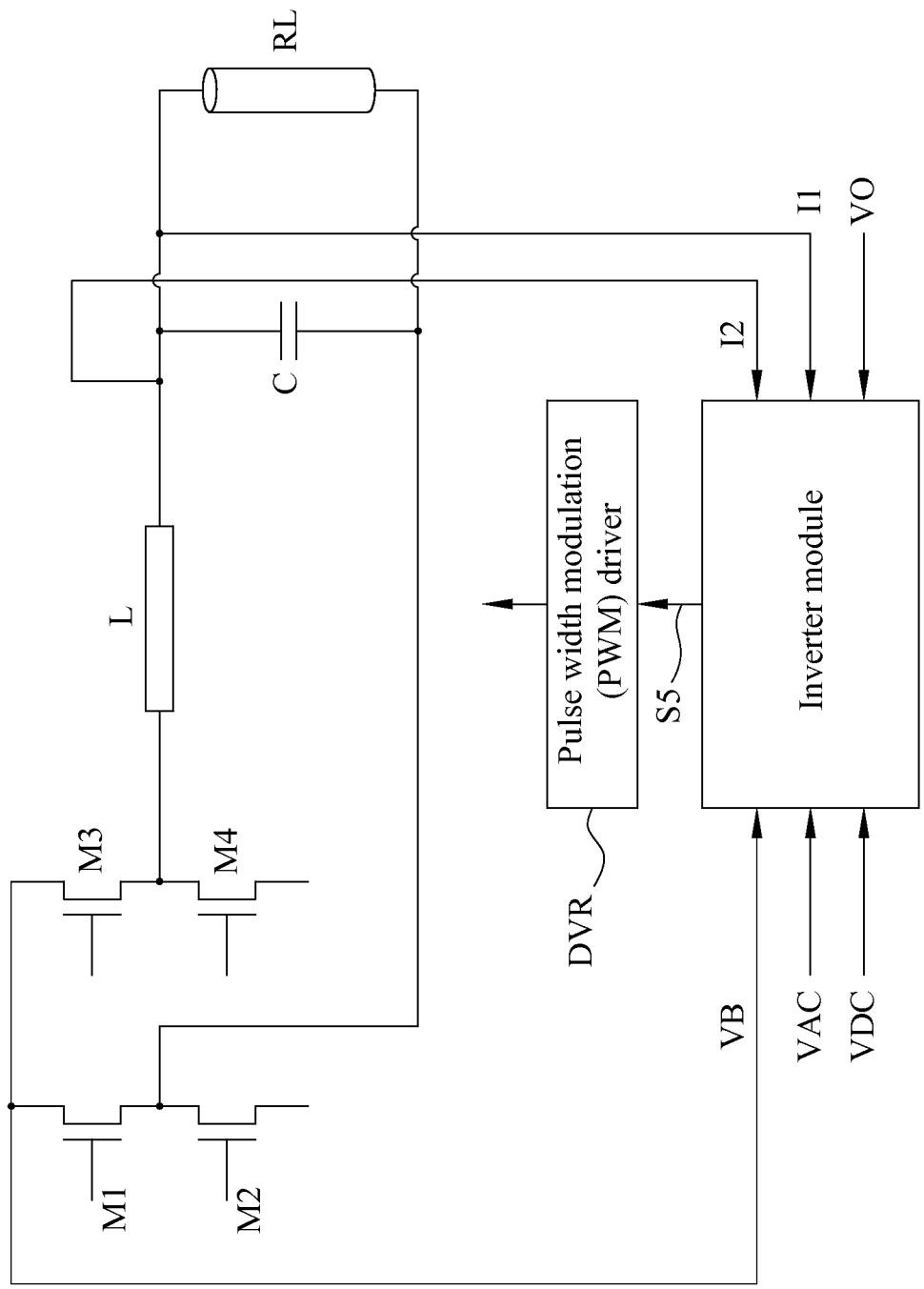
FIG. 2 illustrates an exemplary application of the power converter module according to an exemplary embodiment of the present invention.

FIG. 2 illustrates an exemplary application with the power converter module, according to an exemplary embodiment. It is noted that partial application circuits, such as analog to digital converter and digital to analog converter for analog signal input and out put are omitted for detailed feature description of the present invention. Especially FIG. 2 illustrates an exemplary application and function of the power converter module and is not used to limit the scope of the present invention.

Referring to FIG. 2, the pulse width modulation signal PWM produced from the power converter module 1 is provided to an external pulse width modulation driver DVR, in order to drive the gate terminal of four driving transistors M1, M2, M3, and M4 of a bridge switch unit, and further produce stable power for supplying power to a loading device RL. The drain terminal of driving transistor M1 and M3 are connected to a direct-current high voltage VB, the source terminal of the driving transistor M3 is connected to a filter inductance L, while a filter capacitor C is connected to the filter inductance L and the filter capacitor C is parallel connected to the loading device RL. The second external current I2 is the switch output current of the switch unit or is a current related to the switch output current, such as a partial current of the current on the filter inductance L. The first external current I1 is the loading current of the loading device RL or is a current related to the loading current, such as the difference current of the current on the filter inductance L and the current on the capacitor C. The external voltage VO is terminal voltage of the loading device RL or is a voltage related to the terminal voltage. The alternating-current input voltage VAC may be power voltage supplied from a power company, the direct-current voltage VDC is a direct-current portion voltage provided by the power converter module.

Therefore in exemplary embodiment, the power converter module 1 may use the first external current I1, the second external current I2, and the external voltage VO to control PWM signal S5 with forming a feedback loop control mechanism, to ensure driving transistors M1~M4 providing stable output voltage to loading device RL.

Embodiments of operations and features of the present invention will be further herein described with reference to the following drawings.

Figure 3:
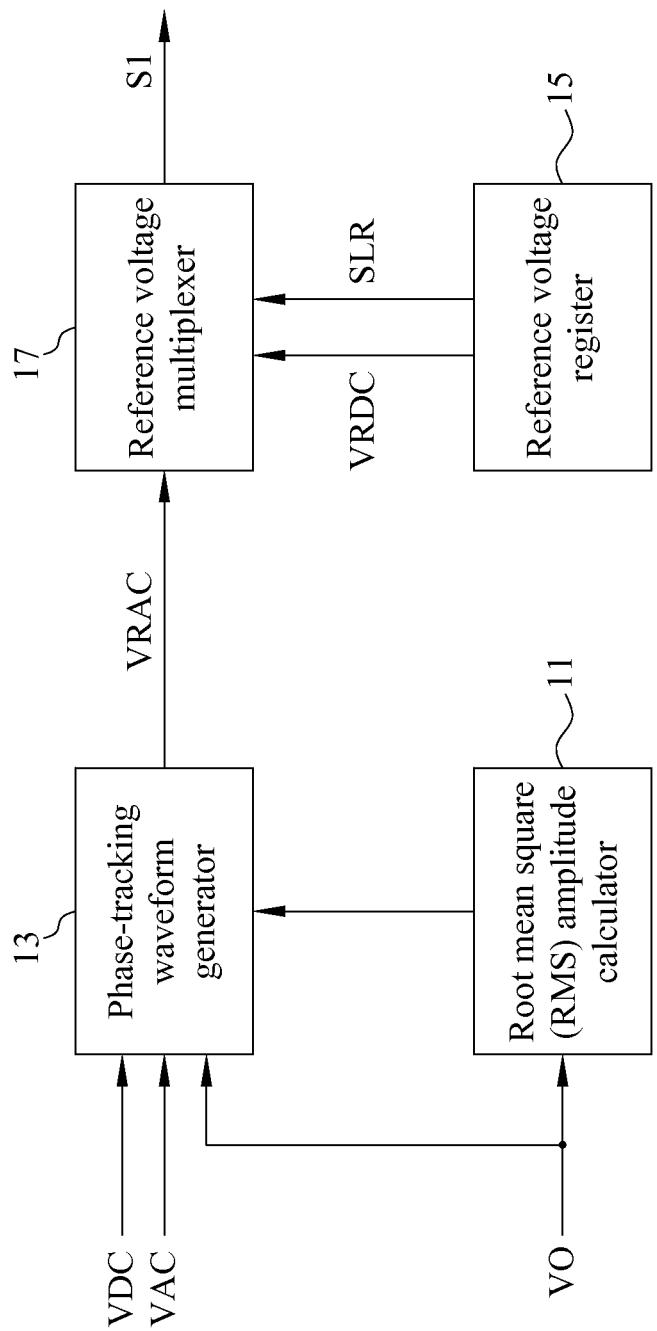
FIG. 3 illustrates a function block diagram of a voltage reference generation unit of a power converter module according to an exemplary embodiment of the present invention.

FIG. 3 illustrates a function block diagram of a reference voltage generation unit of a power converter module according to an exemplary embodiment of the present invention. Referring to FIG. 3, the reference voltage generation unit 10 includes a root mean square (RMS) amplitude calculator 11, a phase-tracking waveform generator 13, a reference voltage register 15, and a reference voltage multiplexer 17, wherein the root mean square (RMS) amplitude calculator 11 receives the external voltage VO for calculating and producing a RMS amplitude, the phase-tracking waveform generator 13 receives the direct-current input voltage VDC and the alternating-current input voltage VAC and produces an alternating-current reference voltage VRAC according to the RMS amplitude. The reference voltage multiplexer 17 receives the alternating-current reference voltage VRAC and direct-current reference voltage VRDC of the reference voltage register 15, and selects the alternating-current reference voltage VRAC or the direct-current reference voltage VRDC as the reference voltage S1 according to a reference selection signal SELR of the reference voltage register 15, and the reference voltage S1 is transmitted out.

The RMS amplitude calculator 11 includes a calculator and a compensation controller (not shown), wherein the compensation controller is one of proportion controller, proportion-integral controller, and proportion-integral-differentiation controller. The calculator uses a predetermined RMS value of the reference voltage register 15 and compares with RMS value of the external voltage VO to produce a RMS error value, and the compensation controller process compensation control, such as proportion compensation control, proportion-integral compensation control, and proportion-integral-differentiation compensation control to transfer to as the RMS amplitude.

The phase-tracking waveform generator 13 includes a phase-tracker, a waveform generator, a compensation controller and a calculator (not shown), wherein said phase-tracker compares the alternating-current input voltage (VAC) with the external voltage VO to produce a corresponding phase error signal. The waveform generator produces a corresponding sine-waveform signal according to a waveform selection signal of the reference voltage register 15, the phase error signal controls frequency of the sine-waveform signal and produces a standard waveform through multiplication with RMS amplitude of the RMS amplitude calculator 11. The compensation controller is one of proportion controller, proportion-integral controller, and proportion-integral-differentiation (PID) controller. The compensation controller receives the direct-current input voltage VDC and a predetermined value of direct current compensation controller of the reference voltage register 15 and processes compensation control (such as proportion compensation control, proportion-integral compensation control, and proportion-integral-differentiation compensation control) to produce a direct-current compensation control value, which is added with said standard waveform to produce the alternating-current reference voltage VRAC.

Figure 4:
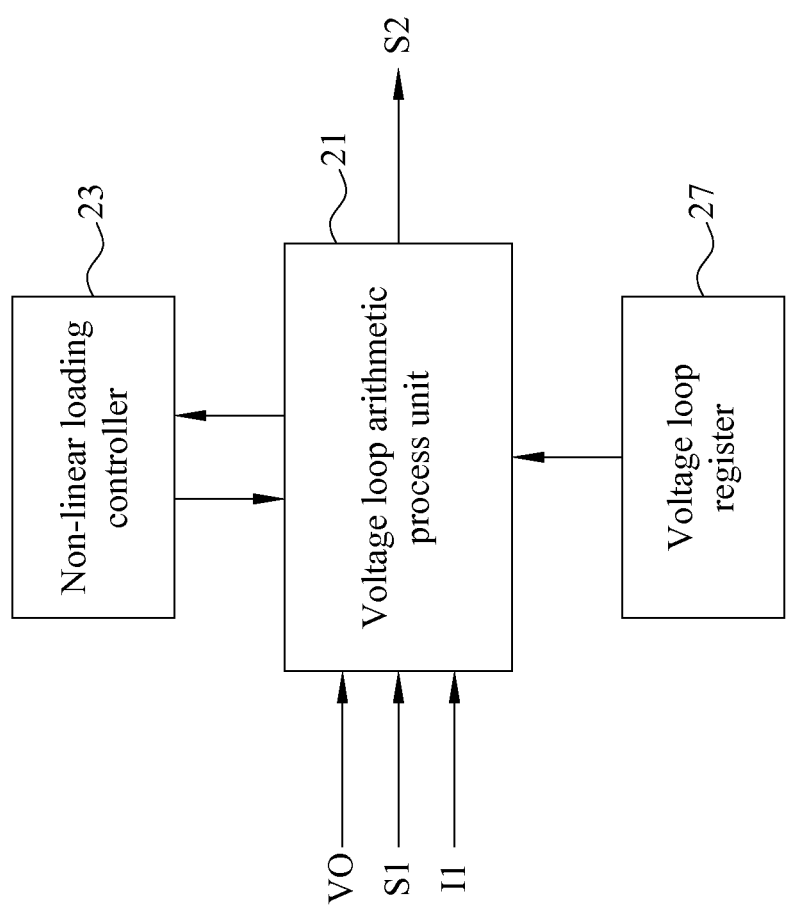
FIG. 4 illustrates a function block diagram of a voltage loop control unit of a power converter module according to an exemplary embodiment of the present invention.

FIG. 4 illustrates a function block diagram of a voltage loop control unit of a power converter module according to an exemplary embodiment of the present invention. Referring to FIG. 4, the voltage loop control unit 20 includes a voltage loop arithmetic process unit 21, a non-linear loading controller 23, and a voltage loop register 27. The voltage loop arithmetic process unit 21 receives said external voltage VO and said reference voltage S1, and proceeds subtraction to have a reference error which is transmitted to the non-linear loading controller 23. The non-linear loading controller 23 proceed non-linear loading control to the reference error according to a non-linear loading control parameter of the voltage loop register 27 to produce a non-linear control output. The voltage loop arithmetic process unit 21 receives the non-linear control output and proceeds compensation control (such as proportion compensation control, proportion-integral compensation control, and proportion-integral-differentiation compensation control) according to a compensation control parameter (such as proportion parameter, proportion-integral parameter, and proportion-integral-differentiation parameter) of the voltage loop register 27 to produce a compensation control output. The compensation control output decides if proceed current decoupling to the first external current I1 according to a current decoupling selection signal of the voltage loop register 27, and the voltage loop arithmetic process unit 21 directly assign the compensation control output as said reference current if not proceeding current decoupling, while the voltage loop arithmetic process unit 21 add the compensation control output with the first external current I1 to produce the reference current S2 if proceeding current decoupling.

Figure 5:
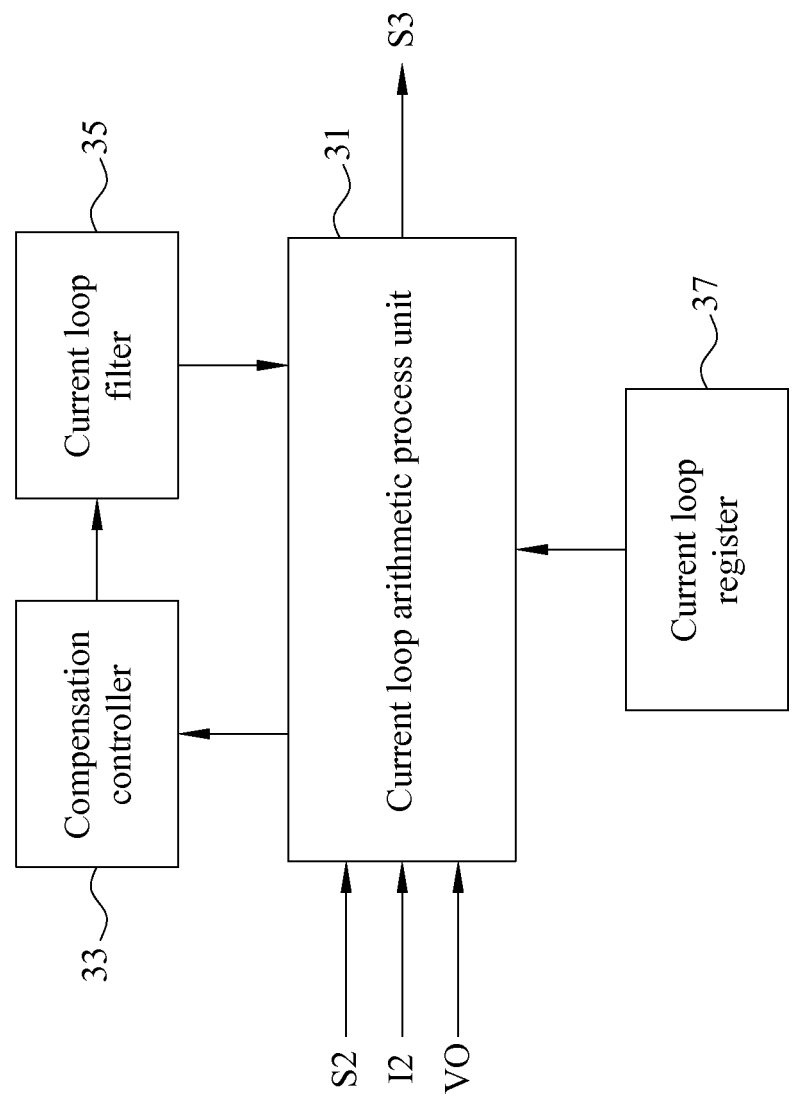
FIG. 5 illustrates a block diagram of a current loop control unit of a power converter module according to an exemplary embodiment of the present invention.

FIG. 5 illustrates a block diagram of a current loop control unit of a power converter module according to an exemplary embodiment of the present invention. Referring to FIG. 5, the current loop control unit 30 includes a current loop arithmetic process unit 31, a compensation controller 33, a current loop filter 35, and a current loop register 37. The current loop arithmetic process unit 31 receives the second external current I2 and the reference current S2 of the voltage loop control unit 20, and proceeds subtraction to have a current error, the current error is proceeded compensation control by the compensation controller 33 (such as proportion compensation controller, proportion-integral compensation controller, and proportion-integral-differentiation compensation controller) according to a current error compensation control parameter (such as proportion compensation control, proportion-integral compensation control, and proportion-integral-differentiation compensation control) of the current loop register 37 to produce a current error compensation control output. The current loop filter 35 receives the current error compensation control output and proceeds filter process according to an error filter parameter of the current loop register 37 to produce a current error filtered value which is received by said current loop arithmetic process unit 31. The current loop arithmetic process unit 31 decide if proceed voltage decoupling according to a voltage decoupling selection parameter of the current loop register 37, and the current loop arithmetic process unit 31 directly assigns said current error filtered value as the first public voltage S3 if not proceeding voltage decoupling, while the current loop arithmetic process unit 31 adds the current error filtered value with the external voltage VO to produce the first public voltage S3 if proceeding voltage decoupling.

Figure 6:
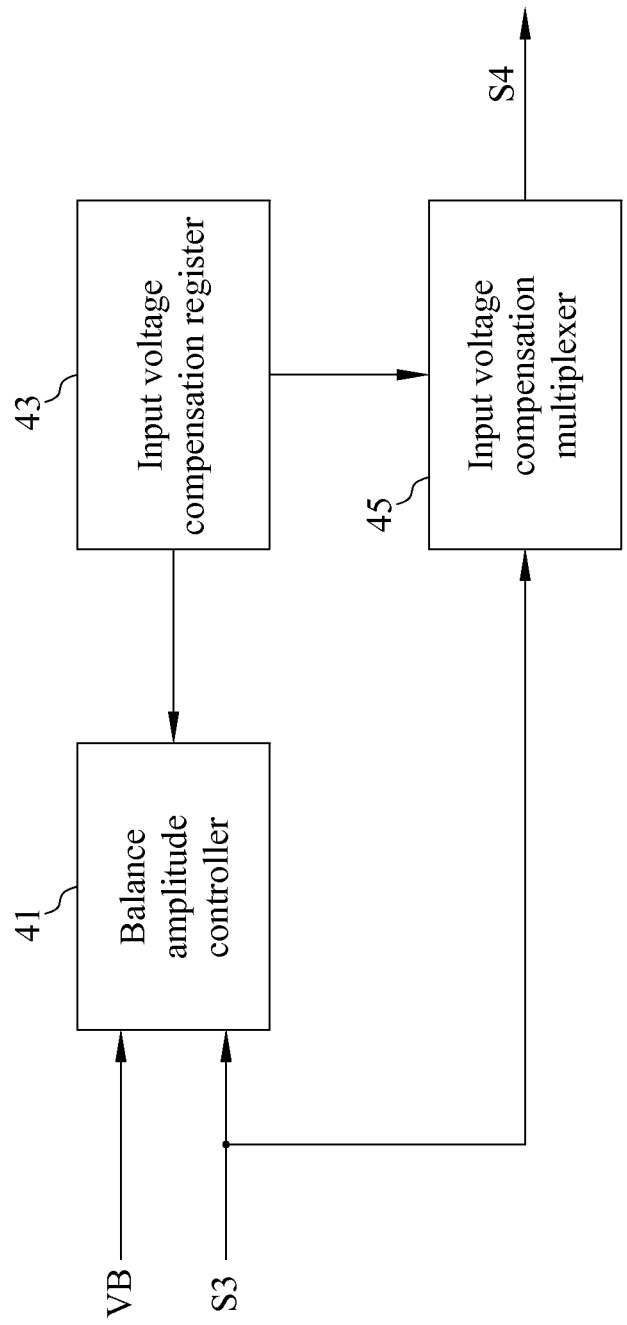
FIG. 6 illustrates a block diagram of a voltage compensation unit of a power converter module according to an exemplary embodiment of the present invention.

FIG. 6 illustrates a block diagram of a voltage compensation unit of a power converter module according to an exemplary embodiment of the present invention. Referring to FIG. 6, the input voltage compensation unit 40 includes a balance amplitude controller 41, an input voltage compensation register 43, and an input voltage compensation multiplexer 45. The balance amplitude controller 41 receives the external direct-current voltage VB and the first public voltage S3 of the current loop control unit 30 and executes balance control process and amplitude control process according to a balance parameter and a amplitude parameter of the input voltage compensation register 43 to produce a voltage compensation value.

The input voltage compensation multiplexer 45 receives the first public voltage S3 and the voltage compensation value and decides the second public voltage S4 according to a voltage compensation selection parameter of the input voltage compensation register 43, and directly assigns the first public voltage S3 as the second public voltage S4 if the voltage compensation selection parameter indicates not proceeding voltage compensation, while chooses the voltage compensation value as the second public voltage S4 if the voltage compensation selection parameter indicate proceeding voltage decoupling.

Figure 7:
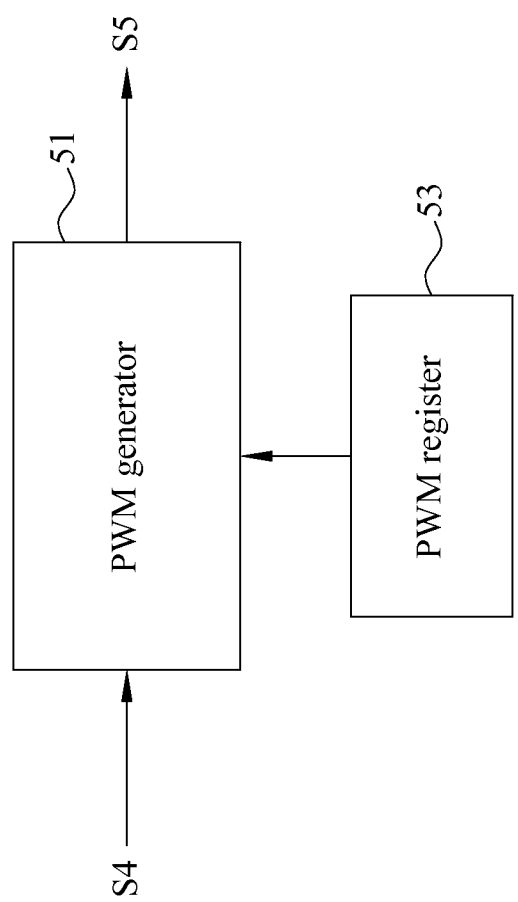
FIG. 7 illustrates a block diagram of a PWM generation unit of a power converter module according to an exemplary embodiment of the present invention.

FIG. 7 illustrates a block diagram of a PWM generation unit of a power converter module according to an exemplary embodiment of the present invention. Referring to FIG. 7, the PWM generation unit 50 includes a PWM generator 51 and a PWM register 53, wherein the PWM generator 51 receives the second public voltage S4 to execute pulse width modulation process according to a stop time parameter of the PWM register 53 to produce said PWM signal S5.

The register listed above, such as the reference register 15, the voltage loop register 27, the current loop register 37, the input voltage compensation register 43, and the PWM register 53 can be partially combined to multiple registers or all combined to a single register.

It is noted that FIGS. 3-7 illustrate an exemplary block diagram of the digital power converter module and is not used to limit the scope of the present invention. Therefore, the present invention includes equivalent circuit that is capable of achieving necessary electrical function.

Another exemplary embodiment of a power converter module is at least an extra multiplexer in the reference voltage generation unit 10, the voltage loop control unit 20, the current loop control unit 30, and the input voltage compensation unit 40, to select the needed first external current I1, the second external current I2, the external voltage VO, and the external direct-current voltage VB according to setting of corresponding registers for a plurality of first external current, a plurality of second external current, a plurality of external voltage, and a plurality of external direct-current voltage, such as application of half-bridge driving architecture with two first external current, two second external current, two external voltage, and two external direct-current voltage.

Another exemplary embodiment of a power converter module further includes a plurality of external analog circuits for analog to digital conversion interface and a digital to analog conversion interface, wherein analog to digital conversion interface is used to convert analog signal to digital signal and digital to analog conversion interface is used to convert digital signal to analog signal.

Another further exemplary embodiment of a power converter module is no processing by the voltage loop arithmetic process unit 30, i.e., the reference current S2 from voltage loop control unit 20 is directly received by input voltage compensation unit 40 instead of received by the voltage loop arithmetic process unit 30, or the voltage loop arithmetic process unit 30 directly assign the first public voltage S3 as reference current S2 so as to proceed necessary operation for best total conversion efficiency of different application requirement.

An advantage of the present invention is that the power converter module is implemented by all-digital design with high operation stability and reliability, may reduce external noise interference dramatically, and also added with the implementation of analog circuits includes analog to digital and digital to analog conversion interface, to control and adjust the characterization of the power converter modules with corresponding setting of internal register especially to increase flexibility of usage for exploring the scope of power converter device applications, such as UPS, solar power system, wind power generation system, or alternating-current power supply.

A further advantage of the present invention is that voltage loop control unit and current loop control unit contain proportion-integral-differentiation compensation controller for setting stop time with corresponding internal register to improve the sine-waveform of output power.

Although the disclosure has been described with reference to the exemplary embodiments. It will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power converter module, comprising:
   a reference voltage generation unit, receiving an external voltage, and producing a reference voltage according to a direct-current input voltage with referring to an alternating current input voltage;
   a voltage loop control unit, receiving said external voltage and a first external current, and producing a reference current according to said reference voltage produced from said reference voltage generation unit;
   a current loop control unit, receiving said external voltage and a second external current, and producing a first public voltage according to said reference current produced from said voltage loop control unit, or directly assign said first public voltage as said reference current,
   an input voltage compensation unit, receiving an external direct-current voltage, and producing a second public voltage according to said first public voltage produced from said current loop control unit; and
   a pulse width modulation (PWM) generation unit, receiving said second public voltage produced from said input voltage compensation unit to produce a pulse width modulation signal,
   wherein said pulse width modulation signal is provided to an external pulse width modulation driver, in order to drive an external switch unit, and further produce an output power to supply power to an external loading device, said external voltage is terminal voltage of said loading device or is a voltage related to said terminal voltage, said first external current is a switch output current of said switch unit or is a current related to said switch output current, said second external current is a loading current of said loading device or is a current related to said loading current, and said external direct-current voltage provides power to said switch unit.

2. The power converter module as claimed in claim 1, wherein said reference voltage generation unit includes a root mean square (RMS) amplitude calculator, a phase-tracking waveform generator, a reference voltage register, and a reference voltage multiplexer, wherein said root mean square (RMS) amplitude calculator receives said external voltage for calculating and producing a RMS amplitude, said phase-tracking waveform generator receives said direct-current input voltage and said alternating-current input voltage and produces an alternating-current reference voltage according to said RMS amplitude, said reference voltage multiplexer receives said alternating-current reference voltage and a direct-current reference voltage of said reference voltage register, and selects said alternating-current reference voltage or said direct-current reference voltage as said reference voltage according to a reference selection signal of said reference voltage register.

3. The power converter module as claimed in claim 2, wherein said RMS amplitude calculator includes a calculator and a compensation controller, said calculator uses a predetermined RMS value of said reference voltage register and compares with the RMS value of said external voltage to produce a RMS error value, said compensation controller processes compensation control to transfer to as said RMS amplitude, and said compensation controller is one of a proportion controller, a proportion-integral controller, and a proportion-integral-differentiation controller.

4. The power converter module as claimed in claim 2, wherein said phase-tracking waveform generator includes a phase-tracker, a waveform generator, a compensation controller and a calculator, wherein said phase-tracker compares said alternating-current input voltage with said external voltage to produce a corresponding phase error signal, said waveform generator produces a corresponding sine-waveform signal according to a waveform selection signal of said reference voltage register, said phase error signal controls frequency of said sine-waveform signal and produces a standard waveform through multiplication with RMS amplitude of said RMS amplitude calculator, said compensation controller receives said direct-current input voltage and a predetermined value of direct-current compensation controller of said reference voltage register and processes corresponding compensation control to produce a direct-current compensation control value, which is added with said standard waveform to produce said alternating-current reference voltage, and said compensation controller is one of a proportion controller, a proportion-integral controller, and a proportion-integral-differentiation controller.

5. The power converter module as claimed in claim 1, wherein said voltage loop control unit includes a voltage loop arithmetic process unit, a non-linear loading controller, and a voltage loop register, said voltage loop arithmetic process unit receives said external voltage and said reference voltage, and proceeds subtraction to have a reference error which is transmitted to said non-linear loading controller, said non-linear loading controller proceeds non-linear loading control to said reference error according to a non-linear loading control parameter of said voltage loop register to produce a non-linear control output, said voltage loop arithmetic process unit receives said non-linear control output according to said voltage loop register and proceeds compensation control according to a compensation control parameter of said voltage loop register to produce a compensation control output, wherein said compensation control parameter is one of a proportion control parameter, an integral control parameter, and a differentiation control parameter, said PID output decides if proceed current decoupling to said first external current according to a current decoupling selection signal of said voltage loop register, and said voltage loop arithmetic process unit directly assigns said compensation control output as said reference current if not proceeding current decoupling, while said voltage loop arithmetic process unit adds said PID output with said first external current to produce said reference current if proceeding current decoupling.

6. The power converter module as claimed in claim 1, wherein said current loop control unit includes a current loop arithmetic process unit, a compensation controller, a current loop filter, and a current loop register, the current loop arithmetic process unit receives said second external current and said reference current, and proceeds subtraction to have a current error, said current error is proceeded compensation control by said compensation controller according to a current error of said current loop register to produce a current error compensation control output, and compensation controller is one of a proportion controller, a proportion-integral controller, and a proportion-integral-differentiation controller, said current loop filter receives said current error compensation control output and proceeds filter process according to an error filter parameter of said current loop register to produce a current error filtered value which is received by said current loop arithmetic process unit, said current loop arithmetic process unit decides if proceed voltage decoupling according to a voltage decoupling selection parameter of said current loop register, and said current loop arithmetic process unit directly assigns said current error filtered value as said first public voltage if not proceeding voltage decoupling, while said current loop arithmetic process unit adds said current error filtered value with said external voltage to produce said first public voltage if proceeding voltage decoupling.

7. The power converter module as claimed in claim 1, wherein said input voltage compensation unit includes a balance amplitude controller, an input voltage compensation register, and an input voltage compensation multiplexer, wherein said balance amplitude controller receives said external direct-current voltage and said first public voltage and executes balance control process and amplitude control process according to a balance parameter and an amplitude parameter of said input voltage compensation register to produce a voltage compensation value, said input voltage compensation multiplexer receives said first public voltage and said voltage compensation value and decides said second public voltage according to a voltage compensation selection parameter of said input voltage compensation register, and directly assigns said first public voltage as said second public voltage if said voltage compensation selection parameter indicates not proceeding voltage compensation, while chooses said voltage compensation value as said second public voltage if said voltage compensation selection parameter indicates proceeding voltage compensation.

8. The power converter module as claimed in claim 1, wherein said PWM generation unit includes a PWM generator and a PWM register, wherein said PWM generator receives said second public voltage to execute pulse width modulation process according to a stop time parameter of said PWM register to produce said PWM signal.

9. The power converter module as claimed in claim 1, wherein a reference voltage register of said reference voltage generation unit, a voltage loop register of said voltage loop control unit, a current loop register of said current loop control unit, a input voltage compensation register of said input voltage compensation unit, and a PWM register of said PWM generation unit are capable of being partially combined to multiple registers or all combined to a single register.

10. The power converter module as claimed in claim 1, wherein said reference voltage generation unit, said voltage loop control unit, said current loop control unit, and said input voltage compensation unit further comprise at least a multiplexer to select required said first external current, said second external current, said external voltage, and said external direct current voltage according to setting of corresponding registers for a plurality of first external currents, a plurality of second external currents, a plurality of external voltages, and a plurality of external direct-current voltages.

11. The power converter module as claimed in claim 1, further comprising a plurality of analog to digital conversion interface and a plurality of digital to analog conversion interface to convert analog signal to digital signal and convert digital signal to analog signal.

* * * * *